US012181012B2

(12) United States Patent
Teramoto et al.

(10) Patent No.: US 12,181,012 B2
(45) Date of Patent: Dec. 31, 2024

(54) DAMPER SPRING

(71) Applicants: NIPPON STEEL CORPORATION, Tokyo (JP); AISIN CORPORATION, Kariya (JP); NHK SPRING CO., LTD., Yokohama (JP); NIPPON STEEL SG WIRE CO., LTD., Tokyo (JP)

(72) Inventors: Shinya Teramoto, Tokyo (JP); Yutaka Neishi, Tokyo (JP); Michimasa Aono, Tokyo (JP); Shuji Kozawa, Tokyo (JP); Yoichi Oi, Kariya (JP); Naoki Takabayashi, Kariya (JP); Junji Tanaka, Kariya (JP); Fumio Takahashi, Yokohama (JP); Shigekazu Nishimoto, Yokohama (JP); Mitsuhiro Kondo, Yokohama (JP); Tatsuro Ochi, Tokyo (JP); Shoichi Suzuki, Tokyo (JP)

(73) Assignees: NIPPON STEEL CORPORATION, Tokyo (JP); AISIN CORPORATION, Kariya (JP); NHK SPRING CO., LTD., Yokohama (JP); NIPPON STEEL SG WIRE CO., LTD., Tokyo (JP)

( * ) Notice: Subject to any disclaimer, the term of this patent is extended or adjusted under 35 U.S.C. 154(b) by 464 days.

(21) Appl. No.: 17/754,566

(22) PCT Filed: Oct. 15, 2020

(86) PCT No.: PCT/JP2020/038929
§ 371 (c)(1),
(2) Date: Apr. 6, 2022

(87) PCT Pub. No.: WO2021/075500
PCT Pub. Date: Apr. 22, 2021

(65) Prior Publication Data
US 2023/0296152 A1    Sep. 21, 2023

(30) Foreign Application Priority Data

Oct. 16, 2019   (JP) ................... 2019-189294

(51) Int. Cl.
*C21D 1/06*    (2006.01)
*C21D 1/30*    (2006.01)
(Continued)

(52) U.S. Cl.
CPC ............... *F16F 1/021* (2013.01); *C21D 1/06* (2013.01); *C21D 1/30* (2013.01); *C21D 6/004* (2013.01);
(Continued)

(58) Field of Classification Search
CPC ...... F16F 1/021; F16F 1/04; F16F 2224/0208; C21D 1/06; C21D 1/30; C21D 6/004;
(Continued)

(56) References Cited

U.S. PATENT DOCUMENTS

2008/0279714 A1   11/2008   Hashimura et al.
2009/0293998 A1   12/2009   Fujino et al.

FOREIGN PATENT DOCUMENTS

JP         02057637 A      2/1990
JP         2006183137 A    7/2006
(Continued)

*Primary Examiner* — Adil A. Siddiqui
(74) *Attorney, Agent, or Firm* — Greer Burns & Crain Ltd.

(57) ABSTRACT

A damper spring having an excellent fatigue limit is provided. A damper spring according to the present embodiment includes a nitrided layer formed in an outer layer, and a core portion that is further inward than the nitrided layer. The chemical composition of the core portion consists of, in mass %, C: 0.53 to 0.59%, Si: 2.51 to 2.90%, Mn: 0.70 to 0.85%, P: 0.020% or less, S: 0.020% or less, Cr: 1.40 to 1.70%, Mo: 0.17 to 0.53%, V: 0.23 to 0.33%, Cu: 0.050% or less, Ni: 0.050% or less, Al: 0.0050% or less, Ti: 0.050% or (Continued)

less, N: 0.0070% or less, and Nb: 0 to 0.020%, with the balance being Fe and impurities. In the core portion, a number density of V-based precipitates having a maximum diameter ranging from 2 to 10 nm is 500 to 8000 pieces/μm².

2 Claims, 2 Drawing Sheets

(51) Int. Cl.
| | |
|---|---|
| *C21D 6/00* | (2006.01) |
| *C21D 8/06* | (2006.01) |
| *C21D 9/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C23C 8/26* | (2006.01) |
| *F16F 1/02* | (2006.01) |
| *F16F 1/04* | (2006.01) |

(52) U.S. Cl.
CPC .............. *C21D 6/005* (2013.01); *C21D 6/008* (2013.01); *C21D 8/065* (2013.01); *C21D 9/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C23C 8/26* (2013.01); *F16F 1/04* (2013.01); *C21D 2211/008* (2013.01); *F16F 2224/0208* (2013.01)

(58) Field of Classification Search
CPC ........ C21D 6/005; C21D 6/008; C21D 8/065; C21D 9/02; C21D 2211/008; C21D 1/25; C21D 1/26; C21D 1/32; C21D 1/76; C21D 6/02; C21D 7/04; C21D 9/561; C21D 2211/004; C21D 1/18; C22C 38/001; C22C 38/002; C22C 38/02; C22C 38/04; C22C 38/06; C22C 38/42; C22C 38/44; C22C 38/46; C22C 38/48; C22C 38/50; C22C 38/22; C22C 38/24; C22C 38/34; C22C 38/26; C22C 38/40; C23C 8/26; C23C 8/02; C23C 8/34; C23C 8/80
See application file for complete search history.

(56) References Cited

FOREIGN PATENT DOCUMENTS

| | | |
|---|---|---|
| JP | 2007302950 A | 11/2007 |
| JP | 2010163689 A | 7/2010 |

[100]a   [010]a

[100]a   [010]a

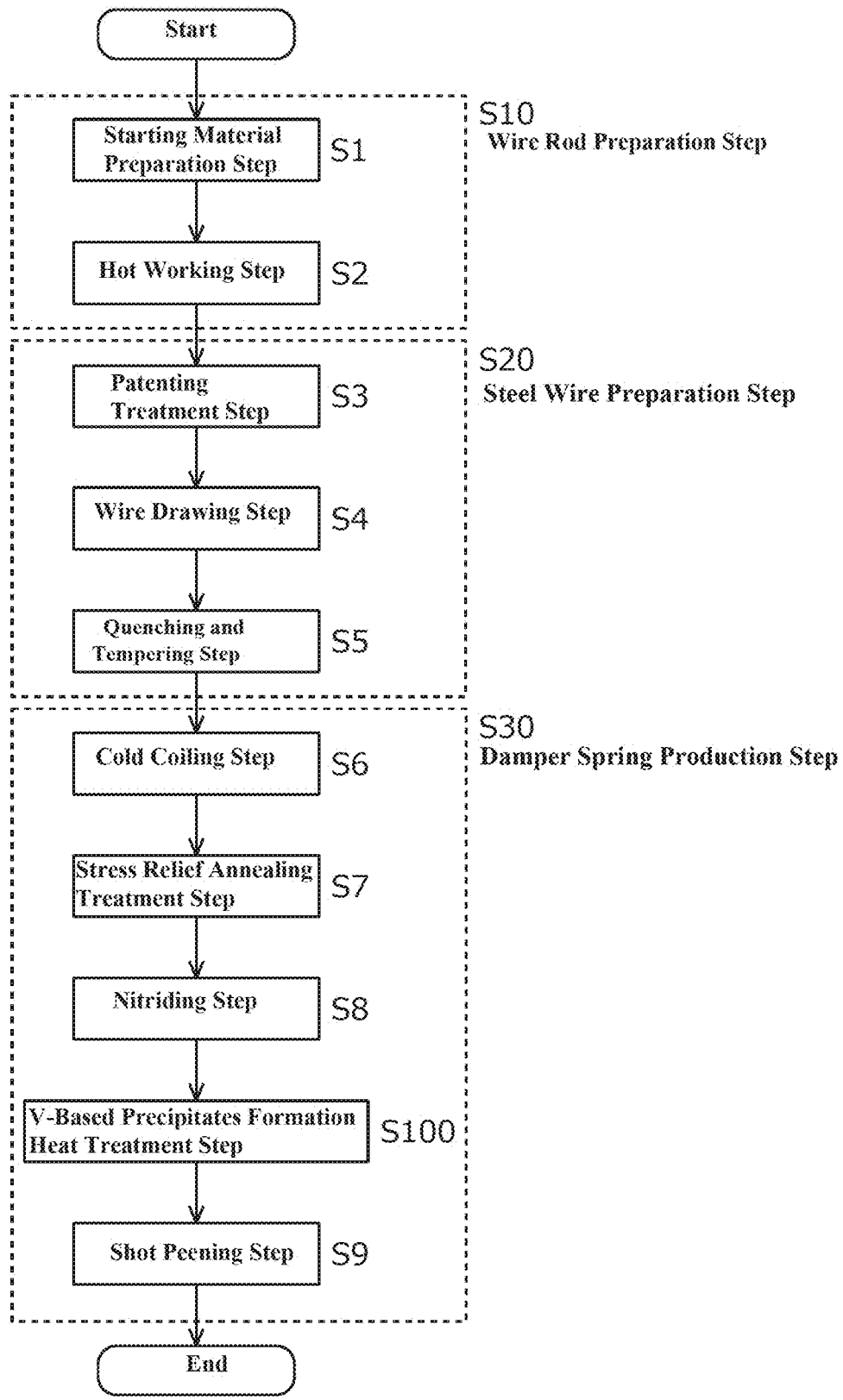

DAMPER SPRING

TECHNICAL FIELD

The present disclosure relates to a spring, and more specifically relates to a damper spring that absorbs an impact or vibrations from the outside.

BACKGROUND ART

Many springs are utilized in automobiles and general machinery. Among the springs used in automobiles and general machinery, damper springs have an action that absorbs an impact or vibrations from the outside. A damper spring is used, for example, in a torque converter that transmits the motive power of an automobile to the transmission. In a case where a damper spring is used in a torque converter, the damper spring absorbs vibrations of a power source (e.g., an engine) of the automobile. A damper spring also absorbs an impact from the outside.

As mentioned above, because there is a need for a damper spring to have a function that absorbs an impact or vibrations from the outside, a damper spring needs to have a high fatigue limit. Therefore, normally the fatigue limit of a damper spring is increased by performing nitriding. One example of a method for producing a damper spring is as follows. A quenching and tempering treatment is performed on a steel wire. The steel wire after the quenching and tempering treatment is subjected to cold coiling to form an intermediate steel material in a coil shape. The intermediate steel material is subjected to stress relief annealing treatment, and thereafter nitriding is performed. After the nitriding, as necessary, shot peening is performed to impart compressive residual stress to the outer layer. A damper spring in which the fatigue limit has been increased is produced by the above process.

Recently, there is a demand for further improvements in the fatigue limit of damper springs.

Techniques relating to improving the fatigue limit of springs are disclosed in Japanese Patent Application Publication No. 2-57637 (Patent Literature 1), Japanese Patent Application Publication No. 2010-163689 (Patent Literature 2), Japanese Patent Application Publication No. 2007-302950 (Patent Literature 3), and Japanese Patent Application Publication No. 2006-183137 (Patent Literature 4).

A steel wire for a spring having a high fatigue limit disclosed in Patent Literature 1 is produced by subjecting a steel having a chemical composition containing, in wt %, C: 0.3 to 1.3%, Si: 0.8 to 2.5%, Mn: 0.5 to 2.0% and Cr: 0.5 to 2.0%, and containing one or more types of element among Mo: 0.1 to 0.5%, V: 0.05 to 0.5%, Ti: 0.002 to 0.05%, Nb: 0.005 to 0.2%, B: 0.0003 to 0.01%, Cu: 0.1 to 2.0%, Al: 0.01 to 0.1% and N: 0.01 to 0.05% as optional elements, with the balance being Fe and unavoidable impurities, to air-cooling or rapid cooling after holding for 3 seconds to 30 minutes at 250 to 500° C. after an austenitizing treatment, and has a yield ratio of 0.85 or less. In this patent literature, the steel wire for a spring having a high fatigue limit that has the aforementioned composition is proposed based on the finding that the fatigue limit of a spring depends on the yield strength of the spring, with the fatigue limit of the spring increasing as the yield strength of the spring increases (see lines 1 to 5 in the right upper column on page 2 of Patent Literature 1).

A spring disclosed in Patent Literature 2 is produced using an oil tempered wire having a tempered martensitic structure, and the oil tempered wire consists of, in mass %, C: 0.50 to 0.75%, Si: 1.50 to 2.50%, Mn: 0.20 to 1.00%, Cr: 0.70 to 2.20% and V: 0.05 to 0.50%, with the balance being Fe and unavoidable impurities. When this oil tempered wire is subjected to gas soft nitriding for two hours at 450° C., the lattice constant of a nitrided layer formed on a wire surface portion of the oil tempered wire is 2.881 to 2.890 Å. Further, when this oil tempered wire is subjected to heating for two hours at 450° C., the tensile strength becomes 1974 MPa or more, the yield stress becomes 1769 MPa or more, and the reduction of area becomes more than 40%. In this patent literature, an oil tempered wire that is to serve as the starting material of a spring which is produced by being subjected to nitriding is defined. In the case of producing a spring by nitriding, as the time period in which nitriding is performed increases, the yield strength and tensile strength of the steel material of the spring decrease. In this case, the internal hardness of the steel material decreases, and the fatigue limit decreases. Therefore, in Patent Literature 2 it is disclosed that by using an oil tempered wire in which the yield strength of the steel material does not decrease even if the nitriding treatment time is long, a spring having a high fatigue limit can be produced (see paragraphs [0025] and [0026] of Patent Literature 2).

A steel wire for a high strength spring disclosed in Patent Literature 3 has a chemical composition containing C: 0.5 to 0.7%, Si: 1.5 to 2.5%, Mn: 0.2 to 1.0%, Cr: 1.0 to 3.0% and V: 0.05 to 0.5%, in which Al is controlled to 0.005% or less (not including 0%), with the balance being Fe and unavoidable impurities. In the steel wire, the number of spherical cementite particles having an equivalent circular diameter ranging from 10 to 100 nm is 30 pieces/$\mu m^2$ or more, and a Cr concentration in the cementite is, in mass %, 20% or more and a V concentration is 2% or more. In Patent Literature 3 it is disclosed that increasing the strength of the steel wire is effective for improving the fatigue limit and settling resistance (see paragraph [0003] of Patent Literature 3). Further, it is disclosed that by making the number of fine spherical cementite particles having an equivalent circular diameter ranging from 10 to 100 nm 30 pieces/$\mu m^2$ or more, and making the Cr concentration in the cementite 20% or more and making the V concentration in the cementite 2% or more in mass %, decomposition and elimination of cementite can be suppressed during a heat treatment such as a stress relief annealing treatment or nitriding during the production process, and the strength of the steel wire can be maintained (paragraph [0011]).

A steel wire which serves as the starting material for a spring which is disclosed in Patent Literature 4 has a chemical composition consisting of, in mass %, C: 0.45 to 0.7%, Si: 1.0 to 3.0%, Mn: 0.1 to 2.0%, P: 0.015% or less, S: 0.015% or less, N: 0.0005 to 0.007%, and t-O: 0.0002 to 0.01%, with the balance being Fe and unavoidable impurities, and has a tensile strength of 2000 MPa or more. On a microscopic observation surface, the occupied area fraction of cementite-based spherical carbides and alloy carbides having an equivalent circular diameter of 0.2 μm or more is 7% or less, the density of cementite-based spherical carbides and alloy carbides having an equivalent circular diameter ranging from 0.2 to 3 μm is 1 pieces/$\mu m^2$ or less, the density of cementite-based spherical carbides and alloy carbides having an equivalent circular diameter of more than 3 μm is 0.001 pieces; $\mu m^2$ or less, the prior-austenite grain size number is 10 or more, the amount of retained austenite is 15 mass % or less, and the area fraction of a sparse region where the density of cementite-based spherical carbides having an equivalent circular diameter of 2 μm or more is low is 3% or less. In Patent Literature 4, it is disclosed that it is necessary to further increase the strength in order to further improve spring performance with respect to fatigue and settling and the like. In Patent Literature 4 it is also disclosed that by controlling the microstructure and controlling the distribution of cementite-based fine carbides, enhancement of the strength of the spring is realized and the spring performance with respect to fatigue and settling and the like is improved (see paragraph [0009] and [0021] of Patent Literature 4).

CITATION LIST

Patent Literature

Patent Literature 1: Japanese Patent Application Publication No. 2-57637
Patent Literature 2: Japanese Patent Application Publication No. 2010-163689
Patent Literature 3: Japanese Patent Application Publication No. 2007-302950
Patent Literature 4: Japanese Patent Application Publication No. 2006-183137

SUMMARY OF INVENTION

Technical Problem

In the respective techniques described in the above Patent Literatures 1 to 4, the technical idea of improving spring characteristics such as the fatigue limit or settling characteristics by increasing the strength (hardness) of the steel material that serves as the starting material of the spring is adopted. However, the fatigue limit of a damper spring may be increased by another technical idea.

An objective of the present disclosure is to provide a damper spring having an excellent fatigue limit.

Solution to Problem

A damper spring according to the present disclosure includes:
a nitrided layer formed in an outer layer, and
a core portion that is further inward than the nitrided layer;
wherein:
a chemical composition of the core portion consists of, in mass %,
C: 0.53 to 0.59%,
Si: 2.51 to 2.90%,
Mn: 0.70 to 0.85%,
P: 0.020% or less,
S: 0.020% or less,
Cr: 1.40 to 1.70%.
Mo: 0.17 to 0.53%,
V: 0.23 to 0.33%,
Cu: 0.050% or less,
Ni: 0.050% or less,
Al: 0.0050% or less,
Ti: 0.050% or less,
N: 0.0070% or less, and
Nb: 0 to 0.020%,
with the balance being Fe and impurities; and
in the core portion, a number density of V-based precipitates having a maximum diameter ranging from 2 to 10 nm is 500 to 8000 pieces/$\mu m^2$.

Advantageous Effect of Invention

A damper spring according to the present disclosure has an excellent fatigue limit.

BRIEF DESCRIPTION OF DRAWINGS

FIG. 2 is a flowchart illustrating a process for producing the damper spring of the present embodiment.

DESCRIPTION OF EMBODIMENTS

Figure 1A:
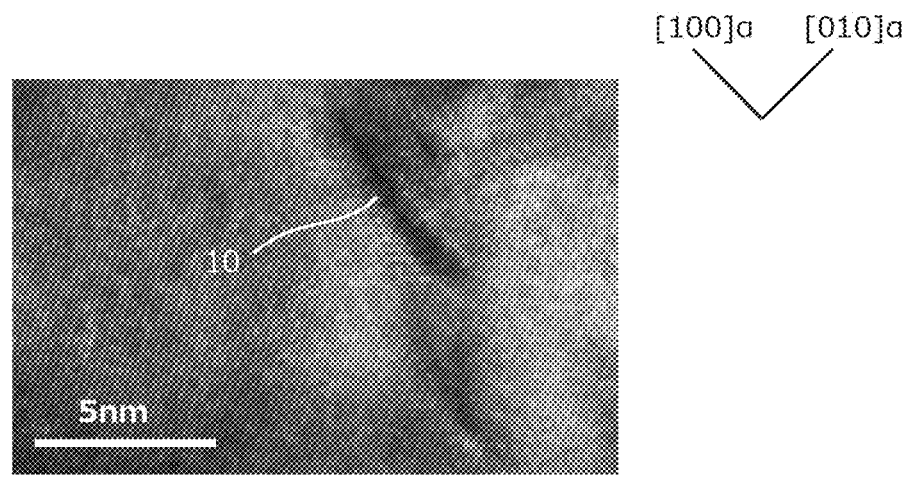
FIG. 1A is one example of a TEM image of a (001) plane in ferrite of a thin film sample.

The present inventors conducted studies pertaining to a damper spring which is excellent in a fatigue limit. First, the present inventors considered increasing the fatigue limit of a damper spring by increasing the strength and hardness of the steel material, similarly to the steel material constituting the springs disclosed in the aforementioned prior documents. Specifically, the present inventors investigated increasing the fatigue limit of a damper spring by increasing the strength and hardness of the steel material by making cementite fine. As a result, as described in Patent Literature 3 and Patent Literature 4, the finer the cementite was made, the higher the strength and hardness of the steel material could be made. Therefore, the present inventors considered that by making cementite fine, the fatigue limit of the damper spring is also increased.

However, if the strength and hardness of the steel material is increased, performing cold coiling becomes difficult, and producing a damper spring becomes difficult. Hence the present inventors considered that there is a limit to the approach of increasing the fatigue limit of a damper spring by increasing the strength and hardness of the steel material by making the cementite fine.

Therefore, the present inventors had the idea of increasing the fatigue limit of a damper spring by adopting a technical idea that is different from the technical idea of increasing the fatigue limit of a damper spring by increasing the strength and hardness of the steel material. As described in Patent Literatures 1 to 4, conventional spring techniques have been based on the idea that the strength and hardness of the steel material has a positive correlation with the fatigue limit of the spring. Thus, the idea that there is a positive correlation between the strength and hardness of the steel material and the fatigue limit is common technical knowledge with respect to spring techniques. Therefore, conventionally, as a substitute for a fatigue test which takes an extremely long time, fatigue limits have been predicted with the strength of the steel material that is obtained by a tensile test that is completed in a short time, or with the hardness of the steel material that is obtained by a hardness test that is completed in a short time. In other words, the fatigue limits of damper springs have been predicted based on the results of a tensile test or a hardness test that do not take a long time, without performing a fatigue test that does take time.

However, the present inventors considered that the strength and hardness of the steel material and the fatigue limit do not necessarily always correlate. Therefore, the present inventors investigated methods for increasing the fatigue limit of a damper spring by another technical idea other than increasing the fatigue limit by increasing the strength and hardness of the steel material.

Here, the present inventors focused their attention on V-based precipitates as typified by V carbides and V carbo-nitrides. In the present specification, the term "V-based precipitates" means precipitates containing V or containing V and Cr. Instead of the conventional technical idea of increasing the fatigue limit of a damper spring by increasing the strength of the steel material, the present inventors conceived of increasing the fatigue limit of a damper spring by formation of a large number of nano-sized fine V-based precipitates. Therefore, the present inventors considered that a chemical composition consisting of, in mass %, C: 0.53 to 0.59%, Si: 2.51 to 2.90%, Mn: 0.70 to 0.85%, P: 0.020% or less, S: 0.020% or less, Cr: 1.40 to 1.70%, Mo: 0.17 to 0.53%, V: 0.23 to 0.33%, Cu: 0.050% or less, Ni: 0.050% or less, Al: 0.0050% or less, Ti: 0.050% or less, N: 0.0070% or less, and Nb: 0 to 0.020%, with the balance being Fe and impurities, is suitable as the chemical composition of a damper spring for increasing the fatigue limit by making use of nano-sized V-based precipitates. The present inventors then produced damper springs by subjecting a steel material having the aforementioned chemical composition to a heat treatment at various heat-treatment temperatures after quenching. The present inventors then investigated the fatigue limit of the damper springs as well as a fatigue limit ratio that is a ratio of the fatigue limit to the core portion hardness of the damper spring.

As a result of such investigations, the present inventors obtained the following novel finding with regard to a damper spring having the aforementioned chemical composition. In the conventional process for producing a damper spring, in a heat treatment (stress relief annealing treatment step or the like) after a quenching and tempering step, a heat treatment is performed at a lower temperature than a nitriding temperature used for nitriding. This is because the conventional process for producing a damper spring is based on the technical idea that the fatigue limit is increased by keeping the strength and hardness of the steel material high. In a case where nitriding is performed, it is necessary to perform heating to a nitriding temperature. Therefore, in the conventional production process, a decrease in the strength of the damper spring has been suppressed by setting a heat-treatment temperature in a heat treatment step other than nitriding to, as much as possible, a temperature that is less than the nitriding temperature.

However, for the damper spring of the present embodiment, instead of the technical idea of increasing the fatigue limit by increasing the strength of the steel material constituting the damper spring, the present inventors adopted the technical idea of increasing the fatigue limit by formation of a large number of nano-sized fine V-based precipitates. For this reason, it has been revealed by the studies and investigations of the present inventors that, during the production process, if a heat treatment at a heat-treatment temperature within the range of 540 to 650° C. is performed to cause a large number of nano-sized fine V-based precipitates to precipitate, even if the heat-treatment temperature for precipitating V-based precipitates is higher than a nitriding temperature and as a result the strength of a core portion of the damper spring decreases (that is, even if the core portion hardness of the damper spring is low), an excellent fatigue limit will be obtained, and a fatigue limit ratio that is a ratio of the fatigue limit to the core portion hardness of the damper spring will be high. More specifically, it has been clarified by the studies and investigations of the present inventors that if the number density of V-based precipitates having a maximum diameter ranging from 2 to 10 nm is 500 pieces/$\mu m^2$ or more, a sufficient fatigue limit will be obtained in the damper spring.

As described above, the damper spring of the present embodiment is not a damper spring derived from the conventional technical idea which is based on the strength and hardness and the fatigue limit having a positive correlation, and is instead a damper spring derived from a completely different technical idea to the conventional technical idea, and is composed as described below.

[1]

A damper spring, including:
a nitrided layer formed in an outer layer, and
a core portion that is further inward than the nitrided layer;
wherein:
a chemical composition of the core portion consists of, in mass %,
C: 0.53 to 0.59%,
Si: 2.51 to 2.90%,
Mn: 0.70 to 0.85%,
P: 0.020% or less,
S: 0.020% or less,
Cr: 1.40 to 1.70%,
Mo: 0.17 to 0.53%,
V: 0.23 to 0.33%,
Cu: 0.050% or less,
Ni: 0.050% or less,
Al: 0.0050% or less,
Ti: 0.050% or less,
N: 0.0070% or less, and
Nb: 0 to 0.020%,
with the balance being Fe and impurities; and
in the core portion, a number density of V-based precipitates having a maximum diameter ranging from 2 to 10 nm is 500 to 8000 pieces/$\mu m^2$.

Here, the term "V-based precipitates" refers to, as mentioned above, carbides or carbo-nitrides containing V, or carbides or carbo-nitrides containing V and Cr. The V-based precipitates may be composite precipitates containing the aforementioned carbides or carbo-nitrides and one or more kinds of other element. The V-based precipitates precipitate in a plate shape along a {001} plane in ferrite. Therefore, in a TEM image of a (001) plane in ferrite, V-based precipitates are observed as line segments (edge portions) extending in a linear shape parallel to the [100] orientation or [010] orientation. Therefore, by observing a TEM image of a (001) plane in ferrite, V-based precipitates can be easily distinguished from other precipitates such as Fe-based carbides (cementite), and the V-based precipitates can be identified. That is, in the present specification, in a TEM image of a (001) plane in ferrite, line segments extending along the [100] orientation or the [010] orientation are defined as V-based precipitates.

[2]

The damper spring described in [1], wherein,
in the chemical composition of the core portion:
an Nb content is 0.005 to 0.020%.

Hereunder, the damper spring of the present embodiment is described in detail. The symbol "%" in relation to an element means "mass percent" unless specifically stated otherwise.

Configuration of Damper Spring of Present Embodiment

The damper spring of the present embodiment is a coil shape. The wire diameter, mean diameter of coil, coil inner diameter, coil outer diameter, free height, number of active coils, total number of coils, direction of helix, and pitch of the damper spring are not particularly limited. The damper spring includes a nitrided layer and a core portion. The nitrided layer is formed in the outer layer. The nitrided layer includes a compound layer, and a diffusion layer that is formed further inward than the compound layer. The nitrided layer need not include a compound layer. Note that, a nitrided layer being formed in the outer layer of a nitrided steel material is technical material that is well known.

The core portion is a base material portion that is further inward than the nitrided layer, and is a portion which is substantially unaffected by the diffusion of nitrogen caused by the nitriding which is to be described later. It is possible to distinguish between the nitrided layer and the core portion in the damper spring by microstructure observation.

Chemical Composition of Core Portion

The chemical composition of the core portion in the damper spring of the present embodiment contains the following elements.

C: 0.53 to 0.59%

Carbon (C) increases the fatigue limit of a damper spring. If the C content is less than 0.53%, even if the contents of other elements are within the range of the present embodiment, a sufficient fatigue limit will not be obtained. On the other hand, if the C content is more than 0.59%, even if the contents of other elements are within the range of the present embodiment, coarse cementite will form. In this case, the ductility of the steel material that will serve as the starting material of the damper spring will decrease. In addition, the fatigue limit of a damper spring will decrease. Accordingly, the C content is 0.53 to 0.59%. A preferable lower limit of the C content is 0.54%, and more preferably is 0.55%. A preferable upper limit of the C content is 0.58%, and more preferably is 0.57%.

Si: 2.51 to 2.90%

Silicon (Si) increases the fatigue limit of a damper spring, and also increases the settling resistance of the damper spring. Si also deoxidizes the steel. In addition, Si increases the temper softening resistance of the steel material. Therefore, even after a quenching and tempering treatment is performed in the process for producing a damper spring, the strength of the damper spring can be maintained at a high level. If the Si content is less than 2.51%, even if the contents of other elements are within the range of the present embodiment, the aforementioned effects will not be sufficiently obtained. On the other hand, if the Si content is more than 2.90%, even if the contents of other elements are within the range of the present embodiment, the ductility of the steel material that will serve as the starting material of the damper spring will decrease. In addition, the fatigue limit of a damper spring will decrease. Therefore, the Si content is 2.51 to 2.90%. A preferable lower limit of the Si content is 2.53%, more preferably is 2.55%, and further preferably is 2.60%. A preferable upper limit of the Si content is 2.85%, more preferably is 2.82%, further preferably is 2.80%, and more preferably is 2.78%.

Mn: 0.70 to 0.85%

Manganese (Mn) improves the hardenability of the steel, and increases the fatigue limit of a damper spring. If the Mn content is less than 0.70%, even if the contents of other elements are within the range of the present embodiment, the aforementioned effect will not be sufficiently obtained. On the other hand, if the Mn content is more than 0.85%, even if the contents of other elements are within the range of the present embodiment, during the damper spring production process, the strength of the steel material that will serve as the starting material of the damper spring will become excessively high and the workability of the steel material will decrease. Therefore, the Mn content is 0.70 to 0.85%. A preferable lower limit of the Mn content is 0.72%, more preferably is 0.73%, further preferably is 0.74%, and more preferably is 0.76%. A preferable upper limit of the Mn content is 0.83%, more preferably is 0.81%, and further preferably is 0.80%.

P: 0.020% or Less

Phosphorus (P) is an impurity that is unavoidably contained. That is, the P content is more than 0%. P segregates at grain boundaries, and decreases the fatigue limit of the damper spring. Therefore, the P content is 0.020% or less. A preferable upper limit of the P content is 0.018%, and more preferably is 0.016%. The P content is preferably as low as possible. However, excessively reducing the P content will raise the production cost. Therefore, when taking into consideration normal industrial production, a preferable lower limit of the P content is 0.001%, and more preferably is 0.002%.

S: 0.020% or Less

Sulfur (S) is an impurity that is unavoidably contained. That is, the S content is more than 0%. S segregates at grain boundaries similarly to P, and combines with Mn to form MnS, and decreases the fatigue limit of the damper spring. Therefore, the S content is 0.020% or less. A preferable upper limit of the S content is 0.018%, and more preferably is 0.016%. The S content is preferably as low as possible. However, excessively reducing the S content will raise the production cost. Therefore, when taking into consideration normal industrial production, a preferable lower limit of the S content is 0.001%, and more preferably is 0.002%.

Cr: 1.40 to 1.70%

Chromium (Cr) improves the hardenability of the steel material. Cr also facilitates formation of V-based precipitates by being contained in combination with V and Mo. Therefore, Cr increases the fatigue limit of a damper spring. If the Cr content is less than 1.40%, even if the contents of other elements are within the range of the present embodiment, the aforementioned effects will not be sufficiently obtained. On the other hand, if the Cr content is more than 1.70%, even if the contents of other elements are within the range of the present embodiment, coarse Cr carbides will excessively form and the fatigue limit of the damper spring will decrease. Therefore, the Cr content is 1.40 to 1.70%. A preferable lower limit of the Cr content is 1.45%, more preferably is 1.48%, and further preferably is 1.50%. A preferable upper limit of the Cr content is 1.65%, more preferably is 1.63%, and further preferably is 1.60%.

Mo: 0.17 to 0.53%

Molybdenum (Mo) improves the hardenability of the steel material. Mo also facilitates formation of V-based precipitates by being contained in combination with V and Cr. Therefore, Mo increases the fatigue limit of the damper spring. Mo also increases the temper softening resistance of the steel material. Therefore, even after a quenching and tempering treatment is performed in the damper spring production process, Mo can maintain the strength of the damper spring at a high level. If the Mo content is less than 0.17%, even if the contents of other elements are within the range of the present embodiment, the aforementioned effects will not be sufficiently obtained. On the other hand, if the Mo content is more than 0.53%, even if the contents of other elements are within the range of the present embodiment, during the damper spring production process, the strength of the steel material that will serve as the starting material of the damper spring will become excessively high and the workability of the steel material will decrease. Therefore, the Mo content is 0.17 to 0.53%. A preferable lower limit of the Mo content is 0.20%, more preferably is 0.23%, and further preferably is 0.25%. A preferable upper limit of the Mo content is 0.50%, more preferably is 0.47%, further preferably is 0.45%, more preferably is 0.40%, and further preferably is 0.35%.

V: 0.23 to 0.33%

Vanadium (V) combines with C and/or N to form fine V-based precipitates, and increases the fatigue limit of a damper spring. If the V content is less than 0.23%, even if the contents of other elements are within the range of the present embodiment, the aforementioned effect will not be sufficiently obtained. On the other hand, if the V content is more than 0.33%, even if the contents of other elements are within the range of the present embodiment, V-based precipitates will coarsen and a large number of coarse V-based precipitates with a maximum diameter of more than 10 nm will form. In such a case, the fatigue limit of the damper spring will, on the contrary, decrease. Therefore, the V content is 0.23 to 0.33%. A preferable lower limit of the V content is 0.24%, more preferably is 0.25%, and further preferably is 0.26%. A preferable upper limit of the V content is 0.32%, more preferably is 0.31%, and further preferably is 0.30%.

Cu: 0.050% or Less

Copper (Cu) is an impurity. During the damper spring production process, Cu decreases the workability of the steel material that will serve as the starting material of the damper spring. Therefore, the Cu content is 0.050% or less. A preferable upper limit of the Cu content is 0.045%, more preferably is 0.043%, further preferably is 0.040%, further preferably is 0.035%, further preferably is 0.030%, further preferably is 0.025%, and further preferably is 0.020%. The Cu content is preferably as low as possible. However, excessively reducing the Cu content will raise the production cost. Therefore, a preferable lower limit of the Cu content is more than 0%, more preferably is 0.001%, and further preferably is 0.002%.

Ni: 0.050% or Less

Nickel (Ni) is an impurity. During the damper spring production process, Ni decreases the workability of the steel material that will serve as the starting material of the damper spring. Therefore, the Ni content is 0.050% or less. A preferable upper limit of the Ni content is 0.045%, more preferably is 0.043%, further preferably is 0.040%, and further preferably is 0.035%. The Ni content is preferably as low as possible. However, excessively reducing the Ni content will raise the production cost. Therefore, a preferable lower limit of the Ni content is more than 0%, more preferably is 0.001%, and further preferably is 0.002%.

Al: 0.0050% or Less

Aluminum (Al) is an impurity. Al forms coarse non-metallic inclusions, and thereby decreases the fatigue limit of the damper spring. Therefore, the Al content is 0.0050% or less. A preferable upper limit of the Al content is 0.0045%, more preferably is 0.0043%, further preferably is 0.0040%, further preferably is 0.0035%, further preferably is 0.0030%, further preferably is 0.0025%, further preferably is 0.0020%, and further preferably is 0.0015%. The Al content is preferably as low as possible. However, excessively reducing the Al content will raise the production cost. Therefore, a preferable lower limit of the Al content is more than 0%, more preferably is 0.0001%, and further preferably is 0.0005%.

Ti: 0.050% or Less

Titanium (Ti) is an impurity. Ti forms coarse TiN. TiN easily becomes a starting point of a fracture, and thus decreases the fatigue limit of the damper spring. Therefore, the Ti content is 0.050% or less. A preferable upper limit of the Ti content is 0.045%, more preferably is 0.043%, further preferably is 0.040%, further preferably is 0.035%, further preferably is 0.030%, further preferably is 0.025%, further preferably is 0.020%, further preferably is 0.015%, and further preferably is 0.010%. The Ti content is preferably as low as possible. However, excessively reducing the Ti content will raise the production cost. Therefore, a preferable lower limit of the Ti content is more than 0%, and more preferably is 0.001%.

N: 0.0070% or Less

Nitrogen (N) is an impurity. N combines with Al or Ti to form AlN or TiN, and decreases the fatigue limit of the damper spring. Therefore, the N content is 0.0070% or less. A preferable upper limit of the N content is 0.0060%, more preferably is 0.0055%, and further preferably is 0.0050%. The N content is preferably as low as possible. However, excessively reducing the N content will raise the production cost. Therefore, a preferable lower limit of the N content is more than 0%, more preferably is 0.0001%, and further preferably is 0.0005%.

The balance in the chemical composition of the core portion of the damper spring according to the present embodiment is Fe and impurities. Here, the term "impurities" refers to elements which, during industrial production of the steel material that serves as the starting material of the damper spring, are mixed in from ore or scrap that is used as a raw material, or from the production environment or the like, and which are allowed within a range that does not adversely affect the damper spring of the present embodiment.

Regarding Optional Elements

The chemical composition of the core portion of the damper spring according to the present embodiment may also contain Nb in lieu of a part of Fe.

Nb: 0 to 0.020%

Niobium (Nb) is an optional element, and need not be contained. That is, the Nb content may be 0%. When contained, Nb combines with C and/or N to form carbides or carbo-nitrides (hereunder, referred to as "Nb carbo-nitrides and the like"). The Nb carbo-nitrides and the like refine austenite grains and thereby increase the fatigue limit of the damper spring. If even a small amount of Nb is contained, the aforementioned effect is obtained to a certain extent. However, if the Nb content is more than 0.020%, coarse Nb carbo-nitrides and the like form, and the fatigue limit of the damper spring decreases. Therefore, the Nb content is 0 to 0.020%. A preferable lower limit of the Nb content is more than 0%, more preferably is 0.003%, further preferably is 0.005%, and further preferably is 0.010%. A preferable upper limit of the Nb content is 0.018%, more preferably is 0.017%, and further preferably is 0.016%.

Number Density of V-Based Precipitates in Damper Spring

In the damper spring of the present embodiment, in the core portion, the number density of V-based precipitates having a maximum diameter ranging from 2 to 10 nm is 500 to 8000 pieces/μm$^2$. In the present specification, the term "number density of V-based precipitates" means, in a case where a thin film sample having a thickness of 100 nm taken from the core portion of the damper spring is observed using a transmission electron microscope (TEM), the number of V-based precipitates per unit area (1 μm$^2$) on the observation surface.

In the present specification, the term "V-based precipitates" refers to precipitates containing V, or V and Cr. Carbides containing V or V and Cr are defined as "V carbides", and carbo-nitrides containing V or V and Cr are defined as "V carbo-nitrides". The V-based precipitates are, for example, V carbides or V carbo-nitrides. The V-based precipitates may be composite precipitates containing either one of a V carbide and a V carbo-nitride and one or more kinds of other element. As mentioned above, the V-based precipitates need not contain Cr. The V-based precipitates precipitate in a plate shape along a {001} plane in ferrite. Therefore, in a TEM image of a (001) plane in ferrite, V-based precipitates are observed as line segments (edge portions) extending in a linear shape parallel to the [100] orientation or [010] orientation. Therefore, by observing a TEM image of the (001) plane in ferrite, V-based precipitates can be easily distinguished from other precipitates such as Fe-based carbides (cementite), and the V-based precipitates can be identified.

By causing a large number of nano-sized V-based precipitates having a maximum diameter ranging from 2 to 10 nm to precipitate in the damper spring of the present embodiment, the fatigue limit is increased. If the number density of V-based precipitates having a maximum diameter ranging from 2 to 10 nm is less than 500 pieces/μm$^2$, a sufficient fatigue limit will not be obtained in the damper spring. If the number density of V-based precipitates having a maximum diameter ranging from 2 to 10 nm is 500 pieces/μm$^2$ or more, the fatigue limit and fatigue limit ratio will noticeably increase in the damper spring. A preferable lower limit of the number density of V-based precipitates having a maximum diameter ranging from 2 to 10 nm is 600 pieces/μm$^2$, more preferably is 700 pieces/μm$^2$, and further preferably is 800 pieces/μm$^2$.

Note that, the upper limit of the number density of V-based precipitates having a maximum diameter ranging from 2 to 10 nm is not particularly limited. However, in the case of the chemical composition described above, the upper limit of the number density of V-based precipitates having a maximum diameter ranging from 2 to 10 nm is 8000 pieces/μm$^2$. The upper limit of the number density of V-based precipitates having a maximum diameter ranging from 2 to 10 nm may be 7500 pieces/μm$^2$, or may be 7000 pieces/μm$^2$.

In the damper spring according to the present embodiment, the number density of V-based precipitates having a maximum diameter ranging from 2 to 10 nm can be determined by the following method. The damper spring according to the present embodiment is cut in the wire diameter direction thereof, and a disc having a surface (cross section) in the wire diameter direction and having a thickness of 0.5 mm is extracted. Grinding and polishing are performed from both sides of the disc using emery paper to make the thickness of the disc 50 μm. Thereafter, a sample with a diameter of 3 mm is taken from a portion (for example, the center portion of the disc) which corresponds to the core portion of the damper spring of the disc. The sample is immersed in 10% perchloric acid-glacial acetic acid solution to perform electrolytic polishing, to thereby prepare a thin film sample having a thickness of 100 nm.

The prepared thin film sample is observed using a transmission electron microscope (TEM). Specifically, first, analysis of Kikuchi lines is performed with respect to the thin film sample to identify the crystal orientation of the thin film sample. Next, the thin film sample is tilted based on the identified crystal orientation, and the thin film sample is set so that the (001) plane in ferrite (body-centered cubic lattice) can be observed. Specifically, the thin film sample is inserted into the TEM, and Kikuchi lines are observed. Tilting of the thin film sample is adjusted so that a [001] direction of ferrite in the Kikuchi lines matches the incident direction of an electron beam. After adjustment, when the actual image is observed, observation will be from a vertical direction to the (001) plane in ferrite. After performing the setting, observation visual fields at an arbitrary four locations of the thin film sample are identified and each observation visual field is observed using an observation magnification of 200,000× and an accelerating voltage of 200 kV. The observation visual field is set to 0.09 μm×0.09 μm.

Figure 1B:
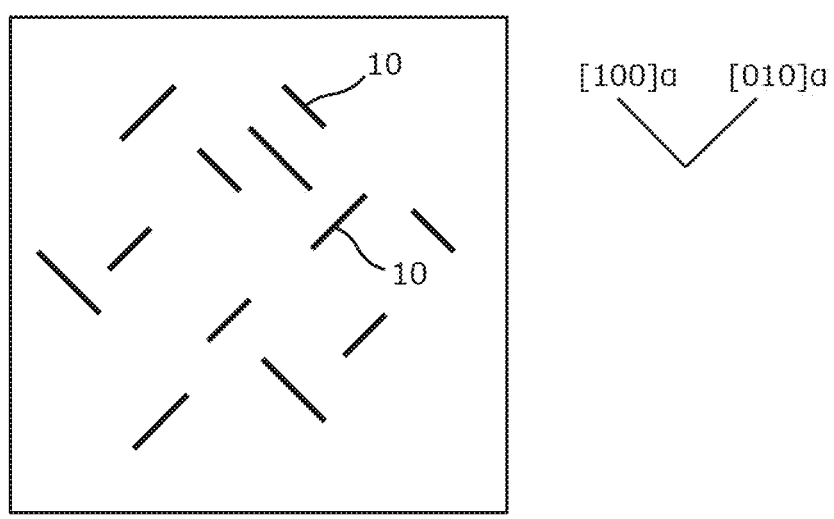
FIG. 1B is a schematic diagram of a TEM image of a (001) plane in ferrite of a thin film sample.

FIG. 1A is one example of a TEM image of a (001) plane in ferrite of a thin film sample, and FIG. 1B is a schematic diagram of a TEM image of a (001) plane in ferrite in a thin film sample. An axis denoted by [100]α in the figures means the orientation in ferrite that is the parent phase. An axis denoted by [010]α in the figures means the [010] orientation in ferrite that is the parent phase. V-based precipitates precipitate in a plate shape along a {001} plane in ferrite. In ferrite grains on the (001) plane, V-based precipitates are observed as line segments (edge portions) extending linearly with respect to the [100] orientation or [010] orientation. In the TEM image, precipitates are shown by black contrast which has a lower brightness compared to the parent phase. Therefore, in a TEM image of a (001) plane in ferrite, black line segments extending along the [100] orientation or [010] orientation are regarded as V-based precipitates. The length of the line segment of a V-based precipitate identified in the observation visual field is measured, and the measured length of the line segment is defined as the maximum diameter (nm) of the relevant V-based precipitate. For example, reference numeral 10 (a black-colored line segment) in FIG. 1A and FIG. 1B denotes a V-based precipitate.

The total number of V-based precipitates having a maximum diameter ranging from 2 to 10 nm in the four observation visual fields is determined by the aforementioned measurement. The number density (pieces/μm$^2$) of V-based precipitates having a maximum diameter ranging from 2 to 10 nm is determined based on the thus-determined total number of V-based precipitates and the gross area (0.0324 μm$^2$) of the four observation visual fields.

Microstructure of Core Portion of Damper Spring

The microstructure of the core portion of the damper spring is a structure mainly composed of martensite. Here, the phrase "the microstructure is a structure mainly composed of martensite" means that the area fraction of martensite in the microstructure is 90.0% or more. Note that, the term "martensite" as used in the present specification means tempered martensite. Phases other than martensite in the microstructure of the core portion of the damper spring are precipitates, inclusions, and retained austenite.

The area fraction of martensite can be determined by the following method. The damper spring according to the present embodiment is cut in the wire diameter direction, and a test specimen is extracted. Among the surfaces of the extracted test specimen, a surface corresponding to a cross section in the wire diameter direction is adopted as an observation surface. After mirror-polishing the observation surface, the observation surface is subjected to etching using 2% nitric acid-alcohol (nital etching reagent). On the etched observation surface, the middle position of a line segment (that is, a radius R) from the surface of the damper spring to the center thereof is defined as an R/2 position. The R/2 position of the observation surface is observed using an optical microscope having a magnification of 500×, and photographic images of an arbitrary five visual fields are generated. The size of each visual field is set to 100 μm×100 μm.

In each visual field, the contrast differs for the respective phases of martensite, retained austenite, precipitates, inclusions and the like. Accordingly, martensite is identified based on the contrast. The gross area ($\mu m^2$) of martensite in each visual field is determined. The proportion of the gross area of martensite in all of the visual fields relative to the gross area (10000 $\mu m^2$×5) of all the visual fields is defined as the area fraction (%) of martensite.

As described above, in the damper spring of the present embodiment, the content of each element in the chemical composition of the core portion is within the aforementioned range of the present embodiment and, in the core portion, the number density of V-based precipitates having a maximum diameter ranging from 2 to 10 nm is within the range of 500 to 8000 pieces/$\mu m^2$. Therefore, the damper spring of the present embodiment has an excellent fatigue limit.

Production Method

Hereunder, one example of a method for producing the damper spring of the present embodiment is described. Note that, as long as the damper spring of the present embodiment is constituted as described above, the production method is not limited to the production method described hereinafter. However, the production method described hereinafter is one favorable example of producing the damper spring of the present embodiment.

FIG. 2 is a flowchart illustrating one example of a process for producing the damper spring of the present embodiment. Referring to FIG. 2, the method for producing the damper spring of the present embodiment includes a wire rod preparation step (S10), a steel wire preparation step (S20), and a damper spring production step (S30). Each of these steps is described hereunder.

Wire Rod Preparation Step (S10)

The wire rod preparation step (S10) includes a starting material preparation step (S1), and a hot working step (S2). In the wire rod preparation step (S10), a wire rod that will serve as the starting material of the steel wire is produced.

Starting Material Preparation Step (S1)

In the starting material preparation step (S1), a starting material having the aforementioned chemical composition is produced. The term "starting material" used here refers to a bloom or an ingot. In the starting material preparation step (S1), first, a molten steel having the aforementioned chemical composition is produced by a well-known refining method. The produced molten steel is used to produce a starting material (bloom or ingot). Specifically, a bloom is produced by a continuous casting process using the molten steel. Alternatively, an ingot is produced by an ingot-making process using the molten steel. The hot working step (S2) which is the next step is performed using the bloom or ingot.

Hot Working Step (S2)

In the hot working step (S2), the starting material (bloom or ingot) prepared in the starting material preparation step (S1) is subjected to hot working to produce a steel material (wire rod) for a damper spring.

The hot working step (S2) includes a rough rolling process and a finish rolling process. In the rough rolling process, first, the starting material is heated. A reheating furnace or a soaking pit is used for heating the starting material. The starting material is heated to 1200 to 1300° C. by the reheating furnace or soaking pit. For example, the starting material is held for 1.5 to 10.0 hours at a furnace temperature of 1200 to 1300° C. After heating, the starting material is extracted from the reheating furnace or soaking pit and subjected to hot rolling. For example, a blooming mill is used for the hot rolling in the rough rolling process. The blooming mill is used to subject the starting material to blooming to produce a billet. If a continuous mill is arranged downstream of the blooming mill, the continuous mill may be used to further perform hot rolling on the billet obtained after performing the blooming, to thereby produce a billet of an even smaller size. In the continuous mill, horizontal stands having a pair of horizontal rolls and vertical stands having a pair of vertical rolls are alternately arranged in a row. By the above process, a billet is produced from the starting material in the rough rolling process.

In the finish rolling process, the billet obtained after the rough rolling process is subjected to hot rolling to produce a wire rod. Specifically, the billet is charged into a reheating furnace and heated at 900 to 1250° C. The heating time at the furnace temperature of 900 to 1250° C. is, for example, 0.5 to 5.0 hours. After heating, the billet is extracted from the reheating furnace. The extracted billet is subjected to hot rolling using a continuous mill to produce a wire rod. The diameter of the wire rod is not particularly limited. The diameter of the wire rod is determined based on the wire diameter of the damper spring that is the end product. A wire rod is produced by the above production process.

Steel Wire Preparation Step (S20)

In the steel wire preparation step (S20), a steel wire that will serve as the starting material of a damper spring is produced. Here, the term "steel wire" means a steel material obtained by subjecting a wire rod that is a hot working material (hot rolling material) to wire drawing one or more times. The steel wire preparation step (S20) includes a patenting treatment step (S3) that is performed as necessary, a wire drawing step (S4), and a quenching and tempering step (S5).

Patenting Treatment Step (S3)

In the patenting treatment step (S3), a patenting treatment is performed on the wire rod produced by the wire rod preparation step (S10) to make the microstructure of a wire rod a ferrite and pearlite structure, and thereby soften the wire rod. It suffices to perform the patenting treatment by a well-known method. The heat-treatment temperature in the patenting treatment is for example, 550° C. or more, and more preferably is 580° C. or more. The upper limit of the heat-treatment temperature in the patenting treatment is 750° C. Note that, the patenting treatment step (S3) is not an essential step, and is an arbitrary step. That is, the patenting treatment step (S3) need not be performed.

Wire Drawing Step (S4)

If the patenting treatment step (S3) is performed, in the wire drawing step (S4) the wire rod after the patenting treatment step (S3) is subjected to wire drawing. If the patenting treatment step (S3) is not performed, in the wire drawing step (S4) the wire rod after the hot working step (S2) is subjected to wire drawing. By performing wire drawing, a steel wire having a desired outer diameter is produced. The wire drawing step (S4) may be performed by a well-known method. Specifically, the wire rod is subjected to a lubrication treatment, and a lubricant coating as typified by a phosphate coating or a metallic soap layer is formed on the surface of the wire rod. The wire rod after the lubrication treatment is subjected to wire drawing at normal temperature. A well-known wire drawing machine may be used for the wire drawing. A wire drawing machine is equipped with dies for subjecting the wire rod to wire drawing.

Quenching and Tempering Step (S5)

In the quenching and tempering step (S5), the steel wire after the wire drawing step (S4) is subjected to a quenching and tempering treatment. The quenching and tempering step (S5) includes a quenching process and a tempering process. In the quenching process, first, the steel wire is heated to the $A_{c3}$ transformation point or higher. For example, the heating is performed using a high frequency induction heating apparatus. The heated steel wire is rapidly cooled. The rapid cooling method may be water cooling or may be oil cooling. By performing the quenching process, the microstructure of the steel wire is made a structure that is mainly composed of martensite.

The steel wire after the quenching process is subjected to a tempering process. The tempering temperature in the tempering process is the $A_{c1}$ transformation point or lower. The tempering temperature is, for example, 250 to 500° C. By performing the tempering process, the microstructure of the steel wire is made a structure that is mainly composed of tempered martensite. A steel wire for a damper spring is produced by the above production process.

Damper Spring Production Step (S30)

In the damper spring production step (S30), a damper spring is produced using the steel wire produced by the steel wire preparation step (S20). The damper spring production step (S30) includes a cold coiling step (S6), a stress relief annealing treatment step (S7), a nitriding step (S8), a V-based precipitates formation heat treatment step (S100), and a shot peening step (S9).

Cold Coiling Step (S6)

In the cold coiling step (S6), the steel wire produced by the steel wire preparation step (S20) is subjected to cold coiling to produce an intermediate steel material of a damper spring. The cold coiling is produced using a well-known coiling apparatus. The coiling apparatus is equipped with, for example, a plurality of transfer roller sets, a wire guide, a plurality of coil forming tools (coiling pins), and a mandrel having a transverse section that is semicircular shape. Each transfer roller set includes a pair of rollers that face each other. The plurality of transfer roller sets are arranged in a row. Each transfer roller set sandwiches the steel wire between the pair of rollers and conveys the steel wire in the wire guide direction. The steel wire passes through the wire guide. The steel wire that passed through the wire guide is bent in an arc shape by the plurality of coiling pins and the mandrel and thereby formed into a coil-shaped intermediate steel material.

Stress Relief Annealing Treatment Step (S7)

The stress relief annealing treatment step (S7) is an essential step. In the stress relief annealing treatment step (S7), an annealing treatment is performed in order to remove residual stress generated in the intermediate steel material by the cold coiling step (S6). The treatment temperature (annealing temperature) in the annealing treatment is set to, for example, 400 to 500° C. Whilst the holding time at the annealing temperature is not particularly limited, for example the holding time is 10 to 50 minutes. After the holding time passes, the intermediate steel material is allowed to cool or is slow-cooled to normal temperature.

Nitriding Step (S8)

In the nitriding step (S8), nitriding is performed on the intermediate steel material after the stress relief annealing treatment step (S7). In the nitriding, nitrogen is caused to penetrate into the outer layer of the intermediate steel material, and a nitrided layer (hardened layer) is formed at the outer layer of the intermediate steel material by solid-solution strengthening caused by solute nitrogen and precipitation strengthening caused by nitride formation.

It suffices to perform nitriding according to well-known conditions. The nitriding is performed at a treatment temperature (nitriding temperature) that is not more than the $A_{c1}$ transformation point. The nitriding temperature is, for example, 400 to 530° C. The holding time at the nitriding temperature is within the range of 1.0 hours to 5.0 hours. The atmosphere inside the furnace in which nitriding is performed is not particularly limited as long as the atmosphere is one in which the chemical potential of nitrogen becomes sufficiently high. The furnace atmosphere for nitriding, for example, may be made an atmosphere in which a gas with carburizing properties (RX gas or the like) is mixed as in the case of soft-nitriding.

V-Based Precipitates Formation Heat Treatment Step (S100)

In the V-based precipitates formation heat treatment step (S100), the intermediate steel material after the nitriding step (S8) is subjected to a heat treatment (V-based precipitates formation heat treatment) to form fine V-based precipitates in the intermediate steel material. By performing the V-based precipitates formation heat treatment step (S100), in the core portion of the damper spring, the number density of V-based precipitates having a maximum diameter ranging from 2 to 10 nm is made 500 to 8000 pieces/$\mu m^2$.

In the V-based precipitates formation heat treatment, a heat-treatment temperature T (° C.) is set within a range of 540 to 650° C. A holding time t (min) at the heat-treatment temperature T (° C.) is not particularly limited, and for example is within a range of 5/60 (that is, 5 secs) to 50 minutes.

The heat-treatment temperature T in the V-based precipitates formation heat treatment may be higher than the nitriding temperature used for nitriding. In the conventional process for producing a damper spring, in a heat treatment (stress relief annealing treatment step or the like) after a quenching and tempering step, a heat treatment is performed at a lower temperature than a nitriding temperature used for nitriding. This is because the conventional damper spring production process is based on the technical idea that the fatigue limit is increased by maintaining the strength and hardness of the steel material at a high level. In a case where nitriding is performed, it is necessary to perform heating to a nitriding temperature. Therefore, in the conventional production process, a decrease in the strength of the steel material has been suppressed by, as much as possible, making a heat-treatment temperature in a heat treatment step other than a nitriding step less than the nitriding temperature. On the other hand, for the damper spring of the present embodiment, instead of the technical idea of increasing the fatigue limit by increasing the strength of the steel material, the technical idea of increasing the fatigue limit by formation of a large number of nano-sized fine V-based precipitates was adopted. Therefore, in the V-based precipitates formation heat treatment, the heat-treatment temperature T is set to 540 to 650° C. which is a temperature region in which it is easy for V-based precipitates to form. A preferable lower limit of the heat-treatment temperature T is 560° C., more preferably is 565° C., and further preferably is 570° C.

In addition, the V-based precipitates formation heat treatment is performed in a manner so that Fn defined by the following equation (1) is within the range of 27.0 to 40.0.

$$Fn = T \times \{t^{1/8} + (2Cr + Mo + 4V)\}/100 \quad (1)$$

T in equation (1) represents a heat-treatment temperature (° C.) in the V-based precipitates formation heat treatment, and t represents a holding time (min) at the heat-treatment temperature T. The content (mass %) of a corresponding element in the chemical composition of the core portion of the damper spring (that is, the chemical composition of the steel wire) is substituted for each symbol of an element in equation (1).

The amount of V-based precipitates that are precipitated is influenced not only by the heat-treatment temperature T (° C.) and the holding time t (min), but also by the respective contents of Cr, Mo and V that are elements which contribute to formation of V-based precipitates.

Specifically, formation of V-based precipitates is facilitated by Cr and Mo. Although the reason for this is not clear, the following reason is conceivable. In a temperature region that is lower than a temperature region in which V-based precipitates form, Cr forms Fe-based carbides such as cementite or Cr carbides. Likewise, in a temperature region that is lower than a temperature region in which V-based precipitates form, Mo forms Mo carbides ($Mo_2C$). As the temperature increases, the Fe-based carbides, Cr carbides, and Mo carbides dissolve and serve as nucleation sites for V-based precipitates. As a result, at the heat-treatment temperature T, formation of V-based precipitates is facilitated.

On the premise that the content of each element in the chemical composition of the core portion of the damper spring (that is, the chemical composition of the steel wire) is within the range of the present embodiment, if Fn is less than 27.0, formation of V-based precipitates will be insufficient in the V-based precipitates formation heat treatment. In this case, in the core portion of the damper spring that is produced, the number density of V-based precipitates having a maximum diameter ranging from 2 to 10 nm will be less than 500 pieces/$\mu m^2$. On the other hand, on the premise that the content of each element in the chemical composition of the core portion of the damper spring (that is, the chemical composition of the steel wire) is within the range of the present embodiment, if Fn is more than 40.0, the formed V-based precipitates will coarsen. In this case, in the core portion of the damper spring that is produced, the number density of V-based precipitates having a maximum diameter ranging from 2 to 10 nm will be less than 500 pieces/$\mu m^2$.

On the premise that the content of each element in the chemical composition of the damper spring (the chemical composition of the steel wire) is within the range of the present embodiment, if Fn is within the range of 27.0 to 40.0, in the core portion of the damper spring that is produced, the number density of V-based precipitates having a maximum diameter ranging from 2 to 10 nm will be within the range of 500 to 8000 pieces/$\mu m^2$.

A preferable lower limit of Fn is 27.5, more preferably is 28.0, further preferably is 28.5, and further preferably is 29.0. A preferable upper limit of Fn is 39.5, more preferably is 39.0, further preferably is 38.5, and further preferably is 38.0.

Shot Peening Step (S9)

The shot peening step (S9) is an essential step. In the shot peening step (S9), shot peening is performed on the surface of the intermediate steel material. By this means, compressive residual stress is imparted to the outer layer of the damper spring, and the fatigue limit can be further increased. The shot peening may be performed by a well-known method. For example, blast media having a diameter of 0.01 to 1.5 mm is used for the shot peening. Well-known blast media such as steel shot or steel beads may be utilized as the blast media. The compressive residual stress imparted to the damper spring is adjusted depending on the diameter of the blast media, the shot velocity, the shot time period (duration), and the amount of blast media shot onto a unit area per unit time.

The damper spring of the present embodiment can be produced by the above production process. In the damper spring of the present embodiment, the content of each element in the chemical composition of the core portion is within the aforementioned range of the present embodiment and, in the core portion, the number density of V-based precipitates having a maximum diameter ranging from 2 to 10 nm is within the range of 500 to 8000 pieces/$\mu m^2$. Therefore, an excellent fatigue limit is obtained.

Note that, in the aforementioned production flow (FIG. 2), the V-based precipitates formation heat treatment step (S100) is performed after the nitriding step (S8). However, as long as the V-based precipitates formation heat treatment step (S100) is after the quenching process in the quenching and tempering step (S5), the V-based precipitates formation heat treatment step (S100) may be performed at any stage. For example, a production flow may be adopted in which, after the nitriding step (S8), the V-based precipitates formation heat treatment step (S100) is not performed before the shot peening step (S9), and instead the V-based precipitates formation heat treatment step (S100) is performed after the shot peening step (S9). Further, a production flow may be adopted in which the V-based precipitates formation heat treatment step (S100) is not performed at a stage that is after the nitriding step (S8) and before the shot peening step (S9), and instead the V-based precipitates formation heat treatment step (S100) is performed at a stage that is after the quenching and tempering step (S5) and before the cold coiling step (S6). In addition, instead of the tempering process in the quenching and tempering step (S5), the V-based precipitates formation heat treatment step (S100) may be performed after the quenching process. In this case, the V-based precipitates formation heat treatment step (S100) also serves as a tempering process. In a case where, instead of the tempering process, the V-based precipitates formation heat treatment step (S100) is performed after the quenching process, the V-based precipitates formation heat treatment step (S100) need not be performed after the nitriding step (S8).

Note that, a producer of the damper spring of the present embodiment may receive the supply of a wire rod from a third party, and perform the steel wire preparation step (S20) and the damper spring production step (S30) using the prepared wire rod. A producer of the damper spring may also receive the supply of a steel wire from a third party, and perform the damper spring production step (S30) using the prepared steel wire.

EXAMPLE

Advantageous effects of the damper spring of the present embodiment will now be described more specifically by way of examples. The conditions adopted in the following examples are one example of conditions adopted for confirming the feasibility and advantageous effects of the damper spring of the present embodiment. Accordingly, the damper spring of the present embodiment is not limited to this one example of conditions.

Molten steels having the chemical compositions shown in Table 1 were produced.

TABLE 1

| Steel Type Number | Chemical Composition (unit is mass %; balance is Fe and impurities) | | | | | | | | | | | | | |
|---|---|---|---|---|---|---|---|---|---|---|---|---|---|---|
| | C | Si | Mn | P | S | Cr | Mo | V | Cu | Ni | Al | Ti | N | Nb |
| A | 0.56 | 2.78 | 0.80 | 0.008 | 0.006 | 1.62 | 0.26 | 0.27 | 0.008 | 0.032 | 0.0012 | 0.001 | 0.0042 | — |
| B | 0.56 | 2.90 | 0.79 | 0.009 | 0.007 | 1.55 | 0.27 | 0.29 | 0.012 | 0.028 | 0.0009 | 0.001 | 0.0040 | — |
| C | 0.55 | 2.51 | 0.80 | 0.008 | 0.007 | 1.58 | 0.27 | 0.28 | 0.014 | 0.029 | 0.0008 | 0.001 | 0.0039 | — |
| D | 0.56 | 2.77 | 0.77 | 0.009 | 0.006 | 1.57 | 0.25 | 0.28 | 0.010 | 0.027 | 0.0013 | 0.001 | 0.0042 | 0.010 |
| E | 0.56 | 2.75 | 0.80 | 0.010 | 0.008 | 1.54 | 0.26 | 0.29 | 0.011 | 0.030 | 0.0010 | 0.002 | 0.0040 | 0.015 |
| F | 0.56 | 2.78 | 0.78 | 0.008 | 0.009 | 1.58 | 0.27 | 0.33 | 0.013 | 0.031 | 0.0009 | 0.001 | 0.0028 | — |
| G | 0.55 | 2.75 | 0.80 | 0.005 | 0.008 | 1.59 | 0.26 | 0.23 | 0.011 | 0.028 | 0.0009 | 0.001 | 0.0040 | — |
| H | 0.55 | 2.73 | 0.78 | 0.007 | 0.008 | 1.41 | 0.27 | 0.29 | 0.009 | 0.022 | 0.0010 | 0.001 | 0.0043 | — |
| I | 0.55 | 2.67 | 0.78 | 0.009 | 0.007 | 1.68 | 0.28 | 0.28 | 0.011 | 0.020 | 0.0008 | 0.002 | 0.0039 | — |
| J | 0.56 | 2.72 | 0.81 | 0.009 | 0.006 | 1.52 | 0.18 | 0.30 | 0.008 | 0.024 | 0.0011 | 0.002 | 0.0046 | — |
| K | 0.56 | 2.70 | 0.77 | 0.007 | 0.009 | 1.54 | 0.51 | 0.28 | 0.010 | 0.023 | 0.0009 | 0.001 | 0.0042 | — |
| L | 0.56 | 2.48 | 0.80 | 0.006 | 0.007 | 1.57 | 0.27 | 0.28 | 0.012 | 0.027 | 0.0012 | 0.001 | 0.0041 | — |
| M | 0.56 | 2.75 | 0.80 | 0.008 | 0.006 | 1.52 | 0.25 | 0.21 | 0.013 | 0.028 | 0.0010 | 0.001 | 0.0046 | — |

In Table 1, the "-" symbol means that the content of the corresponding element was less than the detection limit. That is, it means that the corresponding element was not contained. For example, with regard to the Nb content of Steel Type Number A, the "-" symbol means that the content was "0"% when the content was rounded off to three decimal places. In the chemical compositions of the steel type numbers listed in Table 1, the balance other than the elements listed in Table 1 was Fe and impurities. Each of the aforementioned molten steels was used to produce a cast piece (bloom) by a continuous casting process. After heating the bloom, the bloom was subjected to blooming that is a rough rolling process and thereafter was subjected to rolling by a continuous mill to produce a billet in which a cross section perpendicular to the longitudinal direction was 162 mm×162 mm. The heating temperature used for the blooming was 1200 to 1250° C., and the holding time at the heating temperature was 2.0 hours.

The produced billet was subjected to a finish rolling process to produce a wire rod having a diameter of 5.5 mm. The heating temperature in a reheating furnace for each test number in the finish rolling process was 1150 to 1200° C., and the holding time at the heating temperature was 1.5 hours.

The produced wire rod was subjected to a patenting treatment. The heat-treatment temperature in the patenting treatment was 650 to 700° C., and the holding time at the heat-treatment temperature was 20 minutes. The wire rod after the patenting treatment was subjected to wire drawing to produce a steel wire having a diameter of 4.0 mm. The produced steel wire was subjected to quenching. The quenching temperature was 950 to 1000° C. After the holding time elapsed, the steel wire was subjected to water-cooling. The steel wire after quenching was subjected to tempering. The tempering temperature was 480° C. Steel wires of the respective test numbers were produced by the above process.

The produced steel wire was subjected to a damper spring production process. Specifically, the steel wire of each test number was subjected to cold coiling under the same conditions to produce a coiled intermediate steel material. A stress relief annealing treatment was performed on the intermediate steel material. The annealing temperature in the stress relief annealing treatment was 450° C., and the holding time at the annealing temperature was 20 minutes. After the holding time elapsed, the intermediate steel material was allowed to cool.

The intermediate steel material after the stress relief annealing treatment was subjected to nitriding. The nitriding temperature was set to 450° C., and the holding time at the nitriding temperature was set to 5.0 hours. The intermediate steel material after nitriding was subjected to a V-based precipitates formation heat treatment.

A heat-treatment temperature T, a holding time t (min) at the heat-treatment temperature T (° C.), and an Fn value in the V-based precipitates formation heat treatment were as shown in Table 2. After performing the V-based precipitates formation heat treatment, shot peening was performed under well-known conditions. First, shot peening was performed using cut wire having a diameter of 0.8 mm as the blast media. Next, shot peening was performed using steel shot having a diameter of 0.2 mm as the blast media. The shot velocity, shot time period (duration), and the amount of blast media shot onto a unit area per unit time in the shot peening of the first stage and the second stage were made the same for each test number. Note that, with respect to Test Number 16, a V-based precipitates formation heat treatment was not performed, and the aforementioned shot peening was performed on the intermediate steel material after nitriding.

TABLE 2

| Test Number | Steel Type Number | V-based Precipitates Formation Heat Treatment Process | | | Martensite Area Fraction (%) | V-based Precipitates Number Density (pieces/μm²) | Fatigue Limit (MPa) | Fatigue Limit Ratio |
|---|---|---|---|---|---|---|---|---|
| | | Heat-treatment Temperature T (° C.) | Holding Time t (min) | Fn | | | | |
| 1 | A | 590 | 15 | 35.3 | 98.6 | 3422 | 1530 | 2.62 |
| 2 | B | 590 | 15 | 35.0 | 98.6 | 6427 | 1550 | 2.62 |
| 3 | C | 590 | 15 | 35.1 | 98.1 | 2346 | 1510 | 2.61 |
| 4 | D | 590 | 15 | 34.9 | 98.0 | 2974 | 1530 | 2.62 |
| 5 | E | 590 | 15 | 34.8 | 98.4 | 3290 | 1535 | 2.62 |
| 6 | F | 590 | 15 | 36.3 | 98.1 | 7433 | 1545 | 2.65 |
| 7 | G | 590 | 15 | 34.0 | 98.2 | 1758 | 1525 | 2.61 |
| 8 | H | 590 | 15 | 33.4 | 98.3 | 2967 | 1540 | 2.62 |
| 9 | I | 590 | 15 | 36.4 | 98.6 | 5118 | 1550 | 2.65 |
| 10 | J | 590 | 15 | 34.4 | 98.0 | 3239 | 1540 | 2.61 |
| 11 | K | 590 | 15 | 36.1 | 98.5 | 4575 | 1555 | 2.64 |
| 12 | A | 560 | 30 | 34.2 | 98.0 | 3495 | 1540 | 2.63 |
| 13 | A | 600 | 5 | 34.8 | 98.4 | 3247 | 1530 | 2.62 |
| 14 | L | 590 | 15 | 35.0 | 98.3 | 2038 | 1485 | 2.57 |
| 15 | M | 590 | 15 | 32.6 | 98.8 | 486 | 1420 | 2.43 |
| 16 | A | — | — | — | 98.0 | — | 1460 | 2.22 |
| 17 | A | 500 | 0.1 | 26.6 | 98.3 | — | 1475 | 2.35 |
| 18 | A | 490 | 0.4 | 26.8 | 98.5 | — | 1460 | 2.25 |
| 19 | A | 660 | 40 | 40.7 | 98.8 | 348 | 1435 | 2.56 |
| 20 | H | 540 | 0.08 | 26.9 | 98.2 | — | 1460 | 2.23 |
| 21 | A | 650 | 50 | 40.4 | 99.2 | 406 | 1435 | 2.45 |

Damper springs were produced by the above production process. The produced damper springs of each test number were subjected to the following evaluation tests.

Microstructure Observation Test

The damper spring of each test number was cut in the wire diameter direction thereof, and a test specimen was extracted. Among the surfaces of the extracted test specimen, a surface corresponding to a cross section in the wire diameter direction was adopted as the observation surface. After mirror-polishing the observation surface, the observation surface was subjected to etching using 2% nitric acid-alcohol (nital etching reagent). An R/2 position of the etched observation surface was observed using an optical microscope having a magnification of 500×, and photographic images of an arbitrary five visual fields were generated. The size of each visual field was set to 100 μm×100 μm. In each visual field, the contrast differed for the respective phases of martensite, retained austenite, precipitates, inclusions and the like. Therefore, martensite was identified based on the contrast. The gross area (μm²) of martensite identified in each visual field was determined. The proportion of the gross area of martensite in all of the visual fields relative to the gross area (10000 μm²×5) of all the visual fields was defined as the area fraction (%) of martensite. The area fraction of martensite thus determined is shown in Table 2. In each test number, the martensite area fraction was 90.0% or more.

Test to Measure Number Density of V-Based Precipitates

The damper spring of each test number was cut in the wire diameter direction thereof, and a disc having a surface (cross section) in the wire diameter direction and having a thickness of 0.5 mm was extracted. Grinding and polishing were performed from both sides of the disc using emery paper to make the thickness of the disc 50 μm. Thereafter, a sample having a diameter of 3 mm was taken from the center portion (a portion corresponding to the core portion of the damper spring) of the disc. The sample was immersed in 10% perchloric acid-glacial acetic acid solution to perform electrolytic polishing, to thereby prepare a thin film sample having a thickness of 100 nm.

The prepared thin film sample was observed using a transmission electron microscope. First, analysis of Kikuchi lines was performed with respect to the thin film sample to identify the crystal orientation of the thin film sample. Next, the thin film sample was tilted based on the identified crystal orientation, and the thin film sample was set so that the (001) plane in ferrite (body-centered cubic lattice) could be observed. Specifically, the thin film sample was inserted into a TEM, and Kikuchi lines were observed. Tilting of the thin film sample was adjusted so that a [001] direction of ferrite in the Kikuchi lines matched the incident direction of the electron beam. After adjustment, when the actual image was observed, observation was from a vertical direction to the (001) plane in ferrite. After setting the thin film sample, observation visual fields at an arbitrary four locations of the thin film sample were identified and each observation visual field was observed using an observation magnification of 200000× and an accelerating voltage of 200 kV. The observation visual field was set to 0.09 μm×0.09 μm.

In a TEM image, precipitates are shown with a black contrast of a low brightness compared to the parent phase. Therefore, in a TEM image of a (001) plane in ferrite, black line segments extending along the [100] orientation or [010] orientation were regarded as V-based precipitates. The length of the line segment of the respective V-based precipitates identified in each of the observation visual fields was measured, and the measured length was defined as the maximum diameter (nm) of the relevant V-based precipitate.

The total number of V-based precipitates having a maximum diameter ranging from 2 to 10 nm in the four observation visual fields was determined by the aforementioned measurement. The number density of V-based precipitates having a maximum diameter ranging from 2 to 10 nm (pieces/μm²) was determined based on the determined total number of V-based precipitates and the gross area (0.0324

μm²) of the four observation visual fields. The determined number density of V-based precipitates is shown in the "V-based Precipitates Number Density (pieces/μm²)" column in Table 2. The symbol "-" in the "V-based Precipitates Number Density (pieces/μm²)" column means that the number density was 0 pieces/μm².

Vickers Hardness Measurement Test

The hardness of the core portion of the damper spring of each test number was determined by a Vickers hardness test. Specifically, a Vickers hardness test in conformity with JIS Z 2244 (2009) was performed at an arbitrary three places at an R/2 position ("R" represents the radius) of a cross section in the wire diameter direction of the damper spring of each test number. The test force was set to 0.49 N. The arithmetic mean value of the obtained Vickers hardness values at the three locations was adopted as the Vickers hardness of the core portion of the damper spring of the relevant test number.

Fatigue Test

A fatigue test described hereunder was conducted using the damper springs of each test number. For the fatigue test, a compressive fatigue test was conducted in which a repeated load was applied in the direction of the central axis of the coiled damper springs. An electro-hydraulic servo type fatigue tester (load capacity 500 kN) was used as the testing machine.

As the test conditions, a stress ratio of 0.2 was set as the load, and the frequency was set from 1 to 3 Hz. The test was performed until the damper spring fractured, with a cycle count of $10^7$ cycles set as the upper limit. If the damper spring did not fracture before reaching $10^7$ cycles, the test was stopped at $10^7$ cycles and it was determined that the result of the test was "non-fracture". Here, the maximum value of the test stress when the damper spring was non-fracture at $10^7$ cycles was defined as "$F_M$", and the minimum value of the test stress when the damper spring fractured before reaching $10^7$ cycles at not less than $F_M$ was defined as "$F_B$". The arithmetic mean value of $F_M$ and $F_B$ was defined as "$F_A$", and the value of $F_A$ in a case where $(F_B-F_M)/F_A \leq 0.10$ was defined as the fatigue limit (MPa). On the other hand, in a case where all the damper springs fractured as a result of undergoing the test, that is, in a case where $F_M$ could not be obtained, a test stress corresponding to a life of $10^7$ cycles was extrapolated based on the relation between the fracture life and the test stress, and the fatigue limit (MPa) was defined. Here, the test stress corresponded to the surface stress amplitude at the fracture position. A fatigue limit (MPa) was determined for the damper springs of each test number based on the aforementioned definitions and the evaluation tests. In addition, the obtained fatigue limit and Vickers hardness of core portion were used to determine a fatigue limit ratio (=fatigue limit/Vickers hardness of core portion).

Test Results

The test results are shown in Table 2. Referring to Table 2, in Test Numbers 1 to 13, the chemical composition was appropriate and the production process was also appropriate. Therefore, in the microstructure of the damper spring of each of these test numbers, the martensite area fraction was 90.0% or more. In addition, in each of these test numbers, the number density of V-based precipitates having a maximum diameter ranging from 2 to 10 nm was 500 to 8000 pieces/μm². Therefore, in each of these test numbers, the fatigue limit was 1500 MPa or more, and the fatigue limit ratio (=fatigue limit/Vickers hardness of core portion) was 2.60 or more.

On the other hand, in Test Number 14, the Si content was too low. Therefore, the fatigue limit was low, and the fatigue limit ratio was less than 2.60, which was low.

In Test Number 15, the V content was too low. Therefore, the number density of V-based precipitates having a maximum diameter ranging from 2 to 10 nm was too low. Consequently, the fatigue limit was low, and the fatigue limit ratio was less than 2.60.

In Test Number 16, although the chemical composition was appropriate, a V-based precipitates formation heat treatment was not performed. Therefore, the number density of V-based precipitates having a maximum diameter ranging from 2 to 10 nm was too low. Consequently, the fatigue limit was low, and the fatigue limit ratio was less than 2.60.

In Test Numbers 17 and 18, although the chemical composition was appropriate, the heat-treatment temperature T in the V-based precipitates formation heat treatment was too low. Therefore, the number density of V-based precipitates having a maximum diameter ranging from 2 to 10 nm was too low. Consequently, the fatigue limit was low, and the fatigue limit ratio was less than 2.60.

In Test Number 19, although the chemical composition was appropriate, the heat-treatment temperature T in the V-based precipitates formation heat treatment was too high. Consequently, the V-based precipitates coarsened, and the number density of V-based precipitates having a maximum diameter ranging from 2 to 10 nm was too low. Consequently, the fatigue limit was low, and the fatigue limit ratio was less than 2.60, which was low.

In Test Number 20, although the chemical composition was appropriate, and the heat-treatment temperature T in the V-based precipitates formation heat treatment was also appropriate, Fn was less than 27.0. Therefore, the number density of V-based precipitates having a maximum diameter ranging from 2 to 10 mu was too low. Consequently, the fatigue limit was low, and the fatigue limit ratio was less than 2.60.

In Test Number 21, although the chemical composition was appropriate, and the heat-treatment temperature T in the V-based precipitates formation heat treatment was also appropriate, the Fn value was more than 40.0. Therefore, the number density of V-based precipitates having a maximum diameter ranging from 2 to 10 nm was too low. Consequently, the fatigue limit was low, and the fatigue limit ratio was less than 2.60.

Embodiments of the present invention have been described above. However, the foregoing embodiments are merely examples for implementing the present invention. Accordingly, the present invention is not limited to the above embodiments, and the above embodiments can be appropriately modified and implemented within a range that does not deviate from the gist of the present invention.

The invention claimed is:

1. A damper spring, comprising:
   a nitrided layer formed in an outer layer, and
   a core portion that is further inward than the nitrided layer;
   wherein:
   a chemical composition of the core portion consists of, in mass %,
   C: 0.53 to 0.59%,
   Si: 2.51 to 2.90%, Mn: 0.70 to 0.85%,
P: 0.020% or less,
S: 0.020% or less,
Cr: 1.40 to 1.70%,
Mo: 0.17 to 0.53%,
V: 0.23 to 0.33%,
Cu: 0.050% or less,
Ni: 0.050% or less,
Al: 0.0050% or less,
Ti: 0.050% or less,
N: 0.0070% or less, and
Nb: 0 to 0.020%,
with the balance being Fe and impurities; and
in the core portion, a number density of V-based precipitates having a maximum diameter ranging from 2 to 10 nm is 500 to 8000 pieces/$\mu m^2$.

2. The damper spring according to claim 1, wherein:
in the chemical composition of the core portion:
an Nb content is 0.005 to 0.020%.

* * * * *